United States Patent Office 3,440,332
Patented Apr. 22, 1969

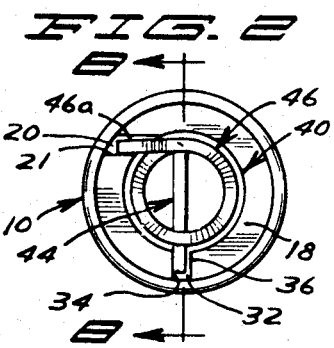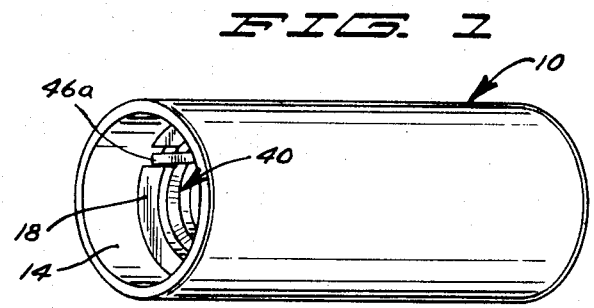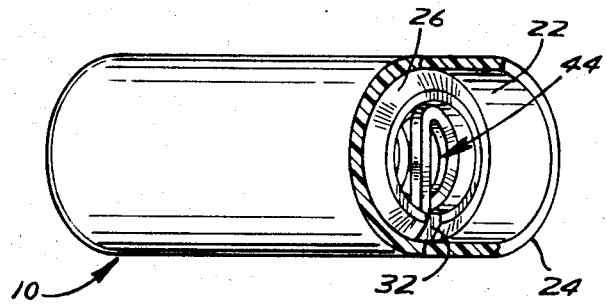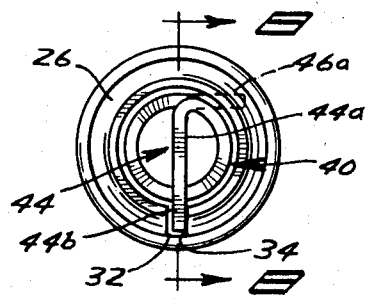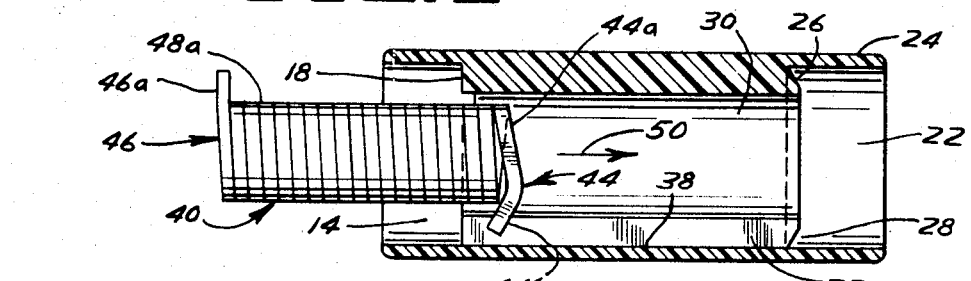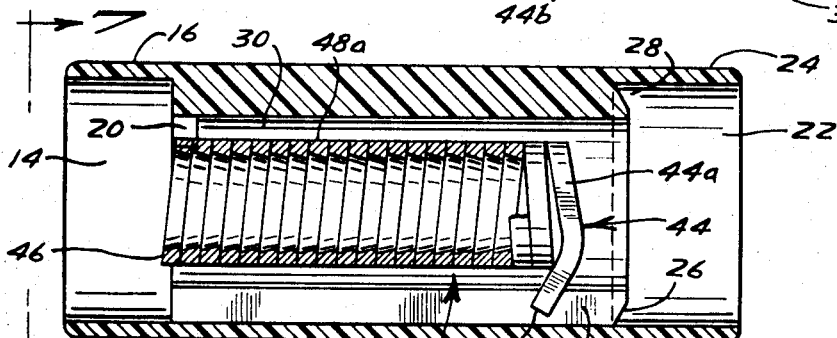

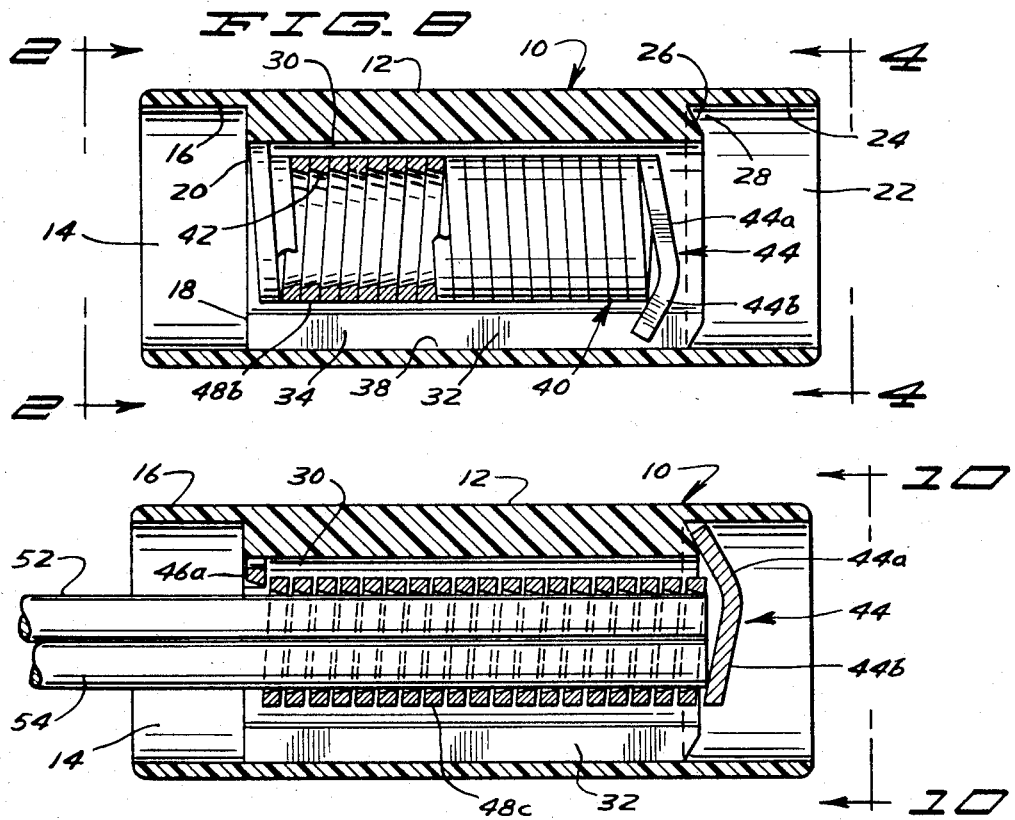

3,440,332
CONNECTOR WITH GROOVED SLEEVE AND HELICALLY WOUND SPRING FOR GRIPPING WIRES WHEN RELEASED
John H. Blomstrand, 214 Hazel Drive,
Corona Del Mar, Calif. 92625
Filed Feb. 2, 1967, Ser. No. 613,508
Int. Cl. H02g 15/08; F16b 37/12
U.S. Cl. 174—87                                    7 Claims

ABSTRACT OF THE DISCLOSURE

A tubular shell is formed with a groove extending longitudinally along its bore or passage. A coil spring with first and second transversely projecting ends is placed in the passage at the factory by locating the first spring end in the groove and then advancing the coil spring longitudinally. The coil spring is somewhat shorter in length than the passage and groove so that when it is fully received in the passage the first spring end remains in the groove at the opposite end from that in which it was initially placed when assembling the spring. The second spring end can then be twisted or angularly rotated to torsionally cock the spring, a notch being formed in the shell at this particular end so that the second spring end can be retained therein and the coil spring thus maintained in its cocked relationship. A section of the first spring end partially blocks the passage so that when the user inserts a plurality of wires sufficiently, at least one of the wires will abut the blocking section and continued movement of the inserted wires will dislodge the first spring end from the groove and the spring immediately contracts against and thereby grips the wires that have been inserted.

BACKGROUND OF THE INVENTION

Field of the invention

This invention relates generally to devices for securing the ends of a plurality of wires together without resort to soldering, welding or the like, and pertains more particularly to a connector where the gripping action is provided automatically without manual effort on the part of the user.

Description of the prior art

A number of devices, such as the wire connector depicted in my U.S. Patent No. 2,656,204, have been devised, but these prior art devices require a manual twisting of the connector in order to effect the connection of the wires to be joined together. I do not in any way wish to disparage such devices for they have met with widespread commercial success, but the need for manual rotation requires a certain amount of personal effort on the part of the user. Even more important is that the speed with which wires can be connected with such prior art devices is relatively slow compared to my present device because the present connector can be sold or delivered in a cocked condition, thereby accelerating the connecting procedure. Also, this can be done without tools and can be done at a relatively low cost inasmuch as no critical metals need be employed. Furthermore, since the manual twisting required heretofore is obviated, the connector envisaged by the present invention can be quite small and compact.

SUMMARY OF THE INVENTION

Briefly stated, the invention is concerned with a rigid shell having a longitudinal passage therein which is intended to receive and contain a coil spring. The spring is composed of transversely projecting first and second ends which are longitudinally spaced by reason of a series of intermediate resilient convolutions. It is intended that the coil spring be placed in the passage of the shell at the factory by introducing the spring at one end, the spring having a length somewhat less than that of the passage and a groove associated therewith so the first end remains in a releasable condition within the passage near the other end of the groove. The second spring end is the end that is angularly rotated so as to expand or enlarge the resilient convolutions sufficiently for the accommodation of a plurality of wires. A notch at the end of the shell via which the coil spring is introduced retains the second spring end in an angularly displaced relationship with the first end of the coil spring. However, when a plurality of wires is inserted by the user into the passage through the same end that the coil spring was introduced, sufficient insertion will cause at least one of the wires to abut a section of the first spring end and this will dislodge the first spring end from that end of the longitudinal groove. The enlarged convolutions of the coil spring are then free to quickly contract and the contraction causes them to tightly grip the inserted wires. An important feature of the invention is that the longitudinal groove performs two important functions: (1) It allows the coil spring to be readily received in the passage of the shell, thereby facilitating the assembly of the connector at the factory, and (2) the same groove serves to retain the coil spring in its cocked condition until the first end is dislodged from the groove at the time the connector is to be used.

BRIEF DESCRIPTION OF THE DRAWINGS

FIGURE 1 is a perspective view of a connector exemplifying my invention, the view being taken from the end at which the coil spring is introduced into the shell and illustrates the coil spring in its cocked condition;

FIGURE 2 is a left end view of the connector corresponding to FIGURE 1, the view being taken in the direction of line 2—2 of FIGURE 8 and illustrates the end of the coil spring that is angularly rotated in order to effect the cocked condition;

FIGURE 3 is a perspective view of the same connector but taken from the opposite end and a portion of the shell being broken away to show the releasable retention of the spring at this end with respect to the end appearing in FIGURES 1 and 2;

FIGURE 4 is an end view corresponding to FIGURE 3, the view also being in the direction of line 4—4 of FIGURE 8;

FIGURE 5 is a longitudinal sectional view through the shell, the coil spring being introduced into the shell passage via one end thereof;

FIGURE 6 is a longitudinal sectional view of the shell and spring after the coil spring has been fully received in the passage but prior to cocking the spring, the view being in the direction of line 6—6 of FIGURE 7;

FIGURE 7 is an end view taken in the direction of line 7—7 of FIGURE 6 for the purpose of illustrating the angular relationship between the ends of the coil spring prior to cocking the spring;

FIGURE 8 is a longitudinal sectional view taken in the direction of line 8—8 of FIGURES 2 and 4, the view representing the coil spring in its cocked condition with its convolutions transversely expanded from the size shown in FIGURE 6;

FIGURE 9 is a longitudinal sectional view in the direction of line 9—9 of FIGURE 10, the view illustrating the coil spring immediately after it has been triggered so as to release the spring from its cocked condition, the convolutions thus gripping and holding the wires that have been inserted, and FIGURE 10 is an end view corresponding to FIGURE 9, the view being in the direction of line 10—10 of FIGURE 9.

DESCRIPTION OF THE PREFERRED EMBODIMENT

Referring now in detail to the drawings, the connector there shown illustrating my invention comprises a rigid shell 10 that may be entirely of dielectric material, such as nylon. The shell 10 includes a cylindrical body 12. A relatively large diameter bore portion 14 appears at the left of the body 12 (FIGURES 1, 5, 6, 8 and 9, this bore portion 14 providing an integral protective skirt 16 and an internally disposed annular shoulder 18. Actually, the shoulder 18, although generally planar, is formed with a notch at 20 which provides a stop or abutment 21 for a purpose hereinafter explained. At the other end of the shell 10 is a bore portion 22 of similar diameter to the bore portion 14 and provides an integral protective skirt 24 and an annular shoulder 26 that functions as a bearing surface, being inclined for a purpose that will become clearer as the description progresses. Stated somewhat differently, there is an annular groove 28 formed by the protective skirt 24 and the inclined shoulder 26. Extending through the shell 10 is a main bore portion or passage 30, there being direct communication with the first-mentioned bore portions 14 and 22. The bore portion 22 may be closed at the extreme right, such as by a suitable plug (not shown) which would only partially fill the bore portion 22; this will provide complete electrical insulation at this end.

Of importance in practicing the present invention is a longitudinal groove 32 coextensive with the passage 30, the groove having parallel side walls 34, 36 and a bottom wall 38. As can be readily seen from, say, FIGURES 6, 8 and 9, the surface of the bottom wall 38 is at the same radial distance as the inner surfaces of the protective skirts 16 and 24.

Within the passage 30 is contained a coil spring generally designated by the reference numeral 40, the spring having a suitable cross-section (trapezoidal as seen in FIGURES 6, 8 and 9) to provide a relatively sharp biting edge 42. The spring 40 has a first end 44 and a second end 46. A series of resilient convolutions 48 reside intermediate the ends 44, 46 and inasmuch as these convolutions appear differently as far as their transverse sizes are concerned in FIGURES 6 (FIGURE 5 having the same convolution size), 8 and 9, different letter suffixes are assigned to the numeral 40 so as to visually differentiate between these figures. For instance, the convolutions 48 in FIGURES 5 and 6 are relatively small since they represent the size of the convolutions in their natural state which is before any enlargement thereof; consequently, the convolutions of FIGURES 5 and 6 have been indicated by the reference numeral 48a. In FIGURE 8, the convolutions 48 have been enlarged by virtue of a cocking condition imparted to the coil spring 40, this condition appearing also in FIGURES 1–4, and they have been designated by the reference numeral 48b. Inasmuch as FIGURE 9 represents the convolutions 48 in a contracted or gripping condition after wires have been inserted, this condition has been labeled 48c.

Attention is now directed to the configuration of the first spring end 44, this end being clearly shown in FIGURES 4 and 10 and fairly well in FIGURES 2 and 7. It will be observed that this end 44 is composed of a transverse section 44a that partially blocks the passage 30 so as to provide obstructive interference at the right end of the passage 30 and a second section 44b which projects into the previously mentioned groove 32, the section 44b being bent slightly toward the second spring end 46. Although the second spring end 46 is visible in dotted outline in FIGURES 4 and 10, it is best seen in FIGURES 2 and 7; as can be discerned from the alluded-to figures, the spring end 46 forms a tangential section 46a which does not interfere with the insertion of a plurality of wires hereinafter referred to.

With the foregoing description in mind, it will now be of assistance to explain in detail how the coil spring 40 is assembled with respect to the shell 10. FIGURE 5 has been prepared for the express purpose of depicting the ease with which the coil spring 40 can be placed or received in the shell 10, more specifically within the passage 30 thereof. The arrow 50 indicates the direction that the spring is introduced. The only criterion is that the section 44b be angularly disposed so as to be in registry with the groove 32 at the left end thereof. Having taken this precaution, the coil spring 40 can be advanced to the right as denoted by the arrow 50 until it reaches the position shown in FIGURE 6. The coil spring 40 has an axial length less than that of the passage 30 and the groove 32 associated therewith. Consequently, even when the spring 40 is fully received in the passage 30, as illustrated in FIGURE 6, the section 44b remains in the groove 32, although near the right end thereof.

Since it is contemplated that the coil spring 40 will be cocked or torsionally wound at the factory, the second spring end 46, more specifically the section thereof designated by the numeral 46a, is now ready for angular rotation. The natural or free position of the section 46a is illustrated in FIGURE 7 and at this stage the section 46a is really just touching the shoulder 18. All that need be done is to rotate the second spring end 46 in a clockwise direction as viewed in FIGURE 7 sufficiently so that it is brought into angular alignment and engagement with the notch 20. In other words, the section 46a is angularly moved from that in which it appears in FIGURE 7 to that in which it is illustrated in FIGURE 2. Obviously, since the section 44b of the first spring end 44 is still in the groove 32, it does not rotate and there is an actual winding or torsional cocking of the coil springs with a concomitant enlargement of the convolutions 48a to the size shown in FIGURE 8 and in which figure the convolutions have been assigned the reference numeral 48b. The winding of the coil spring 40, as described above, is easily accomplished with a suitable implement (not shown) which simply effects the rotation to such an extent that it is brought into alignment with the notch 20 followed by a slight longitudinal advancement so that the section 46a is then engaged in the notch 20. The retraction of the implement then allows the section 46a to bear against the stop or abutment 21 to anchor the second spring end 46. The reaction forces transmitted through the various convolutions 40, more specifically the convolutions in the state designated by the reference numeral 40b, cause the section 44b of the first spring end to bear against the wall 34 of the groove 32 as can be seen in FIGURES 2 and 4.

As already mentioned, the torsional winding of the coil spring 40 is done at the factory. In use, however, the person desiring to connect two wires 52 and 54 together merely has to insert these wires through the bore portion 14 into the convolutions 48b until the end of one of the wires abuts against the partially blocking section 44a of the first spring end 44. Such action causes the section 44b to be dislodged from the right end of the groove 32. When dislodged, the section 44b is free to rotate in the groove 28, actually riding or bearing against the inclined shoulder 26. The section 44b is bent at an angle toward the second spring end 46, as previously indicated, so as to conform to the slope of the shoulder 26. Although not readily apparent, such an angulation of the section 44a makes it more difficult to pull the coil spring 40 from the passage 30 since it would have to be distorted through a considerable reverse angle, that is, away from the second spring end 46, in order to cause it to deflect enough and thereby pass along the internal surface of the passage 30. In other words, the angularly bent section 44b acts as a hook. Quite obviously, the stiffness of the coil spring 40 will influence the resistance against such deflection and retraction, but the angulation is an added precaution and allows a somewhat lower spring constant to be employed as far as the construction of the coil spring is concerned.

When the first spring end 44 has been released by reason of the section 44b being forcibly pushed from the groove 32, the helically wound spring then immediately unwinds due to such release and the convolutions 48b contract to the extent pictured in FIGURE 9 and which condition carries the reference numeral 48c. The convolutions 48 are prevented from returning to their original size as shown in FIGURES 5 and 6 because of the presence of the wires 52 and 54 therewithin. As can be seen from FIGURES 9 and 10, especially the latter, the section 44b has rotated through an angle of approximately 180°. Before cocking the spring 40, the angle was approximately 270° as can be seen from FIGURE 7, for the second spring end 46 was twisted from the position there shown to the notch 20 in order to cock or charge the coil spring. However, it is important to appreciate that it is not the second spring end 46 that is released but the first spring end 44. In other words, the cocking of the coil spring 40 is effected by an initial angular displacement or rotation of the second spring end 46 with respect to the first spring end 44 but the release takes place at the end 44.

The spring constant or strength of the coil spring 40 can be selected so that an extremely strong gripping action is applied to the wires 52, 54. The retention of the wires is appreciably enhanced by the relatively sharp edge 42 which bites or cuts into the wires. It will be remembered that the torsional winding of the coil spring 40 is to be performed at the factory where equipment, such as a simple implement or tool, can be made available for this job and the user is not troubled with such a task.

In summation, all that the user need do is to trigger the release of the first spring end 44 and this release has been highly simplified by having either or both of the wires 52 and 54 themselves cause the release by merely dislodging the section 44b from the end of the groove 32. Thus, the groove 32 not only allows the facile assembly of the spring 40 in the shell 10 but supplies the additional function of retaining the spring in its cocked condition until the connector is actually used. The requisite amount of gripping or holding action is determined by the selection of the coil spring parameters and not by any rotative force applied by the user as heretofore required. Thus, the gripping action is not only controlled accurately but derived virtually instantaneously with the connector herein illustrated.

What is claimed is:

1. A connector for gripping and holding a plurality of wires comprising a rigid shell having a longitudinal passage, said shell being formed with an internal groove extending from one end of the passage to the other, both ends of said groove being open and thereby free of obstruction, a coil spring contained in said passage having first and second longitudinally spaced ends and a series of intermediate resilient convolutions, said first spring end having a section thereof projecting into said groove near one end of the groove, and means retaining said second spring end in an angularly displaced position with respect to said first spring end torsionally cocking said spring and transversely enlarging said convolutions for the reception of the plurality of wires to be gripped, whereby when said section is forced from said one groove end and thereby dislodged from said groove said first spring end is released to uncock said coil spring and said enlarged convolutions contract to grip and hold said wires.

2. A connector in accordance with claim 1 in which said first spring end has a section partially blocking said passage, whereby sufficient insertion of at least one of said wires will cause it to abut said partially blocking section to cause dislodgment of said first-mentioned spring section from said groove.

3. A connector in accordance with claim 2 in which the second-mentioned section of said first spring end is straight and said first-mentioned section is angled toward said second spring end.

4. A connector in accordance with claim 3 in which said shell is cylindrical and the end portion of said shell adjacent said first spring end is formed with an annular groove communicating with said internal groove, said curved section moving in said annular groove when dislodged from said internal groove.

5. A connector in accordance with claim 1 in which said internal groove provides a keyway which allows said coil spring to be inserted into said passage by placement of said section of the first spring end into the groove opposite its said one end and then moved longitudinally toward said one end, and said shell having a notch at said opposite end located in an angularly spaced relation with said groove, said notch receiving a section of said second spring end to form said retaining means.

6. A connector for gripping and holding a plurality of wires comprising a tubular shell of rigid dielectric material having a longitudinal passage extending therethrough, both ends of said groove being open and thereby free of obstruction, said shell also having a longitudinal groove extending transversely outward from said passage, a coil spring contained in said passage, said coil spring having first and second longitudinally spaced, outwardly projecting ends and a series of intermediate resilient convolutions, said coil having a length less than that of said groove so that a section of said first spring end remains in said groove near the second end of said shell, said one end of the sleeve having a notch located in an angularly spaced relation with said groove retaining said second spring end in an angularly displaced position corresponding to the angle between the groove and said notch torsionally cocking said spring and transversely enlarging said convolutions for the reception of the plurality of wires to be gripped, said first spring end having an additional section partially blocking said passage so as to offer obstructive interference when said wires are inserted into said shell at its said one end with the consequence that said first spring end is longitudinally dislodged from the end of said groove near the second end of said shell through the agency of the force exerted by one of said wires when engaged thereby, and said second spring end projecting tangentially into said notch so as to allow entrance of said wires into said passage via said first end, whereby release of said first spring end will uncock said coil spring to allow said enlarged convolutions to contract to grip and hold said wires.

7. A connector in accordance with claim 6 in which said sleeve is formed with an annular groove having an inclined bearing surface extending circularly from said longitudinal groove, said first-mentioned section of said first spring end being angled toward said second spring end in general conformity to said inclined bearing surface.

References Cited

UNITED STATES PATENTS 704,869    7/1902    Fischer et al. _____ 287—104
1,933,555   11/1933   Jasper _____ 174—87

DARRELL L. CLAY, *Primary Examiner.*

U.S. Cl. X.R.

85—32; 151—14; 287—75